United States Patent [19]

Vertommen et al.

[11] Patent Number: 5,247,033
[45] Date of Patent: Sep. 21, 1993

[54] ALLYL HYDROPEROXIDE CHAIN TRANSFER AGENTS

[75] Inventors: Luc L. T. Vertommen, Westervoort; John Meijer, Deventer, both of Netherlands

[73] Assignee: Akzo N.V., Arnhem, Netherlands

[21] Appl. No.: 852,131

[22] PCT Filed: Oct. 16, 1990

[86] PCT No.: PCT/EP90/01781
§ 371 Date: Apr. 28, 1992
§ 102(e) Date: Apr. 28, 1992

[87] PCT Pub. No.: WO91/07440
PCT Pub. Date: May 30, 1991

[30] Foreign Application Priority Data

Nov. 15, 1989 [EP] European Pat. Off. ............ 89202889

[51] Int. Cl.⁵ .................... C08F 2/38; C08F 4/34
[52] U.S. Cl. .................... 526/193; 526/213; 526/230; 526/204; 526/208; 526/209; 526/220; 526/223; 526/319; 526/328; 526/329.7; 526/335; 526/341; 526/346; 526/348
[58] Field of Search ............... 526/230, 319, 320, 193, 526/204, 213, 223; 525/273

[56] References Cited

U.S. PATENT DOCUMENTS

| | | | |
|---|---|---|---|
| 3,069,474 | 12/1962 | Rieche et al. | 568/567 |
| 3,248,374 | 4/1966 | Royals | 526/207 |
| 3,314,931 | 4/1967 | Davis et al. | 526/79 |
| 3,726,832 | 4/1973 | Komatsu et al. | 526/173 |
| 3,800,007 | 3/1974 | Bafford | 525/273 |
| 4,176,219 | 11/1979 | Makino et al. | 526/92 |
| 4,405,742 | 9/1983 | Musch et al. | 524/315 |
| 5,037,892 | 8/1991 | Hogt et al. | 525/298 |

FOREIGN PATENT DOCUMENTS

| | | |
|---|---|---|
| 0219900 | 4/1987 | European Pat. Off. |
| 0273990 | 7/1988 | European Pat. Off. |
| 0322945 | 7/1989 | European Pat. Off. |
| 20332386 | 9/1989 | European Pat. Off. |
| 57-34149 | 2/1982 | Japan |
| 1-41641 | 1/1989 | Japan |
| WO88/04304 | 6/1988 | PCT Int'l Appl. |
| WO91/06535 | 5/1991 | PCT Int'l Appl. |

OTHER PUBLICATIONS

"Displacements Homolytiques Intermoleculars", *Tetrahedron*, vol. 41, No. 2, pp. 5039–5043 (1985).
"Regioselective Synthesis of 2-Hydroperoxy-2-methylenebutanoic Acid Derivatives via Photooxygenation of Tiglic Acid Derivatives", *Synthesis*, vol. 1906, pp. 1050–1052, (1986).
"Alkylated Perepoxides: Peroxonium vs. Phenonium Intermediates from —Baloalkyl tert-Butyl Peroxides and Silver Trifluoroacetate", *J. Org. Chem.*, vol. 51, pp. 1790–1793 (1986).
International Search Report, PCT/EP 90/01781.

*Primary Examiner*—Joseph L. Schofer
*Assistant Examiner*—Mark Nagumo
*Attorney, Agent, or Firm*—Ralph J. Mancini; Louis A. Morris

[57] ABSTRACT

A polymerization method carried out in the presence of unsaturated hydroperoxides useful as molecular weight regulators, is disclosed. Also disclosed are polymers and oligomers made by this process and articles of manufacture comprising one or more polymers or oligomers made by this process. These molecular weight regulating hydroperoxides provide the ability to introduce an epoxy functionality to the oligomer or polymer as well as an additional functionality and a primary hydroxy group. Further, omega substituted or alpha, omega disubstituted polymers may be synthesized using the unsaturated hydroperoxides of the present invention.

5 Claims, No Drawings

ALLYL HYDROPEROXIDE CHAIN TRANSFER AGENTS

The invention relates to methods of radically polymerizing monomers in the presence of allyl hydroperoxide chain transfer agents to thereby control the molecular weights of the resulting polymers and to polymers and shaped objects-containing polymers produced by the instant polymerization methods.

The general concept of employing a molecular weight regulating agent, also known as a chain transfer agent, as an additive during polymerization reactions has been known for a long time. A number of different chain transfer agents having an olefinic group therein, have been employed for this purpose.

Perhaps one of the earlier disclosures of such a polymerization modifying material can be found in U.S. Pat. No. 3,248,374 published on Jun. 24, 1966. wherein the use of an olefin of the formula I as a polymerization modifier is disclosed.

wherein R is hydrogen, halogen or a saturated aliphatic radical and X is halogen, cyanide, phenyl, carboxyl, carbonate, phenyloxy, —CONH$_2$, —CONH—alkyl or —CON—dialkyl. The presence of these olefinic materials during the polymerization of vinylidene-chloride with other olefinic materials rendered the resultant polymer more water soluble.

U.S. Pat. No. 3,726,832 published on Apr. 10, 1973, discloses the use of a cyclic ether or a vinyl ether as a molecular weight regulator for the polymerization of dienes.

U.S. Pat. No. 4,176,219 published on Nov. 27, 1979, discloses the use of allyl halides, benzyl halides or a tertiary aliphatic halide compound as molecular weight regulators for the production of 1,2-polybutadiene.

U.S. Pat. No. 4,405,742, published on Sep. 20, 1983. discloses the use as a regulator, of unsaturated ethers, thioethers, amines, and acrylates and thioacrylates of acrylamides for the purpose of polymerizing chloroprene to produce an improved polychloroprene product.

Japanese Patent Publication Hei-1-41641 discloses a number of unsaturated hydroperoxides and their use as polymerization initiators. None of the compounds claimed in the present application are specifically disclosed or exemplified.

Finally, PCT patent application WO 88/04304 published on Jun. 16, 1988 discloses the use of compounds of the formula (II) for the purpose of controlling the molecular weight and end group functionality of polymers.

wherein $R_1$ is hydrogen or a group capable of activating the vinylic carbon towards free radical addition: Y is $OR_2$ or $CH_2X(R_2)_n$, where $R_2$ is an optionally substituted alkyl, optionally substituted alkenyl, optionally substituted alkynyl, or optionally substituted saturated or unsaturated carbocyclic or heterocyclic ring; X is an element other than carbon selected from Groups IV, V, VI or VII of the Periodic Table or a group consisting of an element selected from Groups IV, V or VI to Which is attached one or more oxygen atoms; and n is a number from 0 to 3 such that the valency of X is satisfied and, when n is greater than 1. the groups represented by $R_2$ may be identical or different.

When this broad formula is literally interpreted and Y is selected to be $CH_2XR_2$ and X is selected to be an element from Group VI to which is attached one or more oxygen atoms and that element from Group VI is oxygen, one obtains, as one of a multitude of possibilites, an unsaturated peroxide. However, the application text itself makes no reference to the possibility that compounds of the formula II can, in fact, be hydroperoxides and no examples employing hydroperoxides of the formula II are included in the text of the application. Further, oxygen is not included in the more specific list of suitable elements for X and hydroperoxides are not included in the list of suitable oxygen containing groups represented by X. Finally, on page 5 it is disclosed that when compounds of the formula II wherein Y is $CH_2XR_2$ are employed as chain transfer agents, a polymer or oligomer is produced which contains a polymerizable olefinic group at one end thereof. This last statement clearly excludes hydroperoxides from being considered by one of ordinary skill in the art because, as will be later discussed herein, the use of such an unsaturated hydroperoxide would not produce the required polymerizable olefinic group at one end of the polymer or oligomer. Accordingly, although the broad formula of the above-identified patent application literally encompasses unsaturated hydroperoxides, one of ordinary skill in the art would not consider such materials within the scope of this broad formula.

U.S. Pat. No. 3,314,931 discloses the use of cumene hydroperoxides and di-t-butyl peroxides as chain transfer agents in polymerizations. U.S. Pat. No. 3,800,007 also relates to peroxy-containing chain transfer agents. Neither of these references mentions the chain transfer agents of the present invention.

The present invention relates a process for the radical polymerization of monomers in the presence of allyl hydroperoxides characterized in that said allyl hydroperoxides are represented by the following formula:

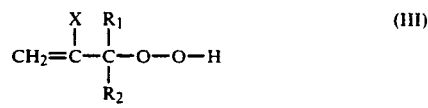

wherein $R_1$ and $R_2$ may be the same or different and are selected from hydrogen, $C_1$–$C_4$ alkyl or together may form a $C_5$–$C_7$ aliphatic ring, and X is an activating group capable of enhancing the reactivity of the olefinic group towards free radical addition.

The present invention also relates to polymers produced by this polymerization process and shaped objects comprising one or more of such polymers.

The hydroperoxides used in the process of the invention correspond to the above-described formula III. They may be prepared in the usual manner for similar hydroperoxides. In preparing the hydroperoxides of the present invention use may be made of the procedure described in, "Regioselective Synthesis of 2-

Hydroperoxy-2-methylene-Butanoic Acid Derivates via Photooxygenation of Tiglic Acid Derivates." Adam. W and Griesbeek A, *Synthesis* 1906, 1050 (1986). the disclosure of which is hereby incorporated by reference herein.

The organic hydroperoxides used in the process of the present invention are generally represented by the following formula:

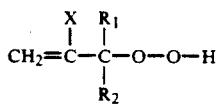
(III)

$R_1$ and $R_2$ may be the same or different and are selected from hydrogen $C_1$–$C_4$ alkyl, or together may form a $C_5$–$C_7$ aliphatic ring, and X is an activating group capable of enhancing the reactivity of the olefinic group towards free radical addition.

X is an activating group capable of enhancing the reactivity of the olefinic group towards free radical addition. Preferably. X is a group i5 selected from the group consisting of ester, acid, carbonyl, alkoxy carbonyl, alkoxy, phenyl, substituted aromatic, aryloxycarbonyl, carboxy, acyloxy, aryloxy, epoxy, carbamoyl, halogens, halocarbons, carbonates, sulfones, sulfoxides, phosphonates, phosphine oxides, hydroxy, amino,

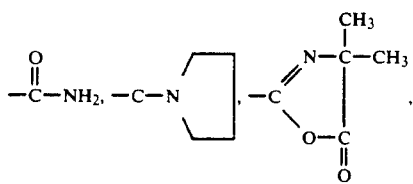

and cyano or a group including two or more of these functionalities which may be the same or different. In a preferred embodiment, X is an electron-withdrawing group. X may also combine with $R_1$ to form a $C_5$–$C_7$ aliphatic ring.

The group X may be selected on the basis of its effect on the chain transfer coefficient of the hydroperoxide. More particularly, the ideal chain transfer coefficient is about one. Thus, for a particular hydroperoxide, X can be selected to control the reactivity of the chain transfer agent such that the chain transfer coefficient is as close to one as possible. In this manner, the monomeric starting starting materials can be added in the ratio in which they are desired in the polymeric products, and the desired reactant ratio can be maintained throughout the reaction thereby permitting the reaction to be carried out to complete monomer conversion, as is often desirable in coatings applications.

As typical examples of the unsaturated hydroperoxides which are useful as chain transfer agents according to the present invention, the following compounds may be mentioned:

2-phenyl-3-hydroperoxy-propene-1;
2-ethoxycarbonyl-3-hydroperoxy-propene-1;
2-ethoxycarbonyl-3-hydroperoxy-butene-1;
2-ethoxycarbonyl-3-methyl-3-hydroperoxy-butene-1;
2-ethoxy-3-hydroperoxy-pentene-1; 2-chloro-3-hydroperoxy-hexene-1;
2-cyano-3-butyl-3-hydroperoxy-butene-1; and
2-p-tolyl-3-hydroperoxy-pentene-1.

The hydroperoxides can be prepared, transported, stored and applied as such or in the form of powders, granules, solutions, aqueous suspensions, emulsions, pastes or any other known method. Which of these physical forms is preferred will depend on the particular polymerization system being employed. Also, considerations of safety (desensitization) may play a role. Desensitizing agents may, in fact, be used with the hydroperoxides of the present invention and particularly suitable desensitizing agents include solid carrier materials such as silica, chalk and clay, inert plasticizers or solvents such as mono-or dichloro benzene, and of course water.

The process of the present invention employs compounds of the formula III as alternatives to known chain transfer agents for the control of molecular weight. The process of the present invention may be operated in the same manner as processes employing conventional chain transfer agents such as thiols. For example, the present process can be used in the manufacture of synthetic rubbers and other polymer formulations, where reduced molecular weight aids polymer processing and improves the polymer properties. The process is also applicable to the production of low molecular weight polymers and oligomers for a variety of applications such as for use in paints or coatings.

The chain transfer agents of the present invention offer several advantages. First, these materials exhibit an unexpectedly good ability to control molecular weights in polymerization processes. Thus, polymers of various molecular weights, with accurate control of the Mn, can be obtained. In its simplest form, molecular weight can be regulated simply by varying the amount of hydroperoxide chain transfer agent added to the system. Secondly, the method of the present invention is extremely versatile.

Thirdly, as a result of the process of the present invention, each polymer chain may be terminated by at least a bifunctional end group. This is the result of the rearrangement of the hydroperoxide functionality to form an epoxy functionality, in combination with the carrying over of the group X from the unsaturated hydroperoxide initiator into the end group of the formed polymer or oligomer. The process of the present invention is extremely useful in producing omega substituted polymers, as well as alpha, omega disubstituted polymers. These polymers and oligomers produced by the process of the present invention may be grafted onto other polymers or reacted with other monomers, polymers or oligomers to form block copolymers or a graft copolymers. Such copolymers have many known uses. The polymers/oligomers produced can also be involved in cross-linking reactions.

In addition, the functional end groups on the polymers or oligomers made by the process of the present invention may be changed to other functional groups by known reaction processes. For example, the epoxy functionality may simply be converted to a hydroxy functionality using known methods.

In the present process, one simply carries out the normal polymerization process in the presence of one or more compounds of the formula III to thereby regulate the molecular weight of the polymer and provide functional end groups on the polymer. The reaction is generally carried out under normal polymerization conditions for the monomer being polymerized.

As an initiator may be used conventional polymerization initiators known in the art. The most preferred initiator will often depend upon the particular monomer which will be polymerized. In the case of styrene or methyl methacrylate polymerizations, the initiator of choice is azobisisobutyronitrile (AIBN). Generally, the amount of initiator used will be determined by known data for the particular polymerization process and will be independent of the type and amount of the chain transfer agent to be employed.

The chain transfer agent itself may be employed in various amounts depending primarily upon the monomer being polymerized, the chain transfer coefficient of the chain transfer agent and the desired molecular weight range to be obtained. As little as 0.001 mole percent of chain transfer agent based on the monomer can be used and up to 30.0 mole percent may also be employed. In general, from 0.1 to 15 mole percent of the chain transfer agent will produce the desired result. Of course, mixtures of different chain transfer agents may also be employed.

As suitable polymerizable monomers may be mentioned acrylates, methacrylates, styrene, styrene derivatives, vinyl esters, dienes, acrylonitrile, and α-olefins.

It is preferred to select a chain transfer agent which has a decomposition temperature above the polymerization temperature since decomposition of the chain transfer agent will prevent it from acting to regulate molecular weight. However, this need not always be the case. For example, in some instances it may be desirable for the unsaturated peroxide to act as both a chain transfer agent and an initiator, in which case some decomposition of the hydroperoxide will be desirable.

The present invention also relates to the polymers and oligomers which are formed by the process of the invention. In this respect, it has been verified by spectral analyses that these materials include an hydroxy functionality as well as the group X. Accordingly, these oligomers and polymers are special because of the many synthetic possibilities offered by the presence of an hydroxy group as well as the group X.

Finally, the present invention also includes articles of manufacture which comprise one or more polymers or oligomers made by the process of the present invention. These articles of manufacture are useful in the coating industry, as lubricants, processing aids and interfacial agents for polymers, among other uses.

The following examples are presented to further illustrate the present invention.

EXAMPLE 1

Polymerization of Styrene in the Presence of 2-ethyloxycarbonyl-3-hydroperoxy butene-1 (AHP)

To a 1.2 molar solution of styrene in o-dichlorobenzene was added 0.53 mol % AIBN and varying amounts of AHP as a chain transfer regulator. The polymerization was carried out at a temperature of 80° C. over a period of 60 minutes. The results are shown in table 1 and include a control polymerization on where no chain transfer agent was employed. The chain transfer coefficient of AHP for styrene was calculated to be 0.89.

TABLE 1

| [AHP]/[MONOMER] | Mn (ZORBAX ™) | Monomer Conversion % |
|---|---|---|
| 0 | 8961 | 13.0 |
| 0.0058 | 5424 | 13.6 |
| 0.011 | 4124 | 12.1 |
| 0.023 | 2925 | 11.0 |
| 0.039 | 2104 | 11.2 |

TABLE 1-continued

| [AHP]/[MONOMER] | Mn (ZORBAX ™) | Monomer Conversion % |
|---|---|---|
| 0.056 | 1662 | 10.3 |

ZORBAX ™ is a trademark for a silica-based support material

The polymeric products from Example 1 were subjected to spectral analysis and it was determined that these polymers contained terminal end groups which are glycidates of the following formula and primary hydroxy groups:

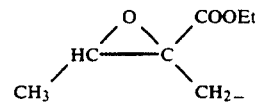

This confirms the formation of an epoxy group from the initial peroxy functionality as well as the carrying of the group X (COOEt) over to the final polymer, and the reinitiation by the OH radical.

COMPARATIVE EXAMPLE 2

Polymerization of methyl methacrylate in the presence of t-pentenylperoxy-2,3-epoxy propane (TPPEP)

To a 1.25 molar solution of methyl methacrylate in o-dichlorobenzene were added 0.5 mol % of AIBN and varying amounts of TPPEP. The polymerization was carried out at 80° C. over a period of 60 minutes. The polymerization results are shown in Table 2. The chain transfer coefficient of TPPEP for methyl methacrylate polymerization was 0.0055.

COMPARATIVE EXAMPLE 3

Polymerization of styrene in the presence of TPPEP

To a 1.25 molar solution of styrene in o-dichlorobenzene were added 0.5 mol % of AIBN and varying amounts of TPPEP. The polymerization was carried out at 80° C. over a period of 60 minutes. The polymerization results are shown in Table 2. The chain transfer coefficient of TPPEP for styrene polymerization was 0.0047.

TABLE 2

| | Mn's and monomer conversions for MMA and styrene polymerisations in the presence of TPPEP | | |
|---|---|---|---|
| MONOMER | [TPPEP]/[MONOMER] | Mn | MONOMER CONVERSION % |
| MMA | 0.0 | 19005 | 55.8 |
| | 0.1 | 17290 | 54.8 |
| | 0.2 | 15955 | 54.8 |
| | 0.4 | 13402 | 53.2 |
| | 0.7 | 10934 | 53.1 |
| | 1.0 | 9268 | 49.3 |
| styrene | 0.0 | 9061 | 17.1 |
| | 0.1 | 8712 | 17.0 |
| | 0.2 | 8328 | 17.0 |
| | 0.4 | 7642 | 17.1 |
| | 0.7 | 7068 | 18.7 |
| | 1.0 | 6412 | 18.3 |

EXAMPLE 4

Polymerization of Butyl Acrylate in the Presence of AHP.

The procedure of Example I was repeated except that butyl acrylate was substituted for styrene and the polymerization time was reduced to 30 minutes. The chain transfer coefficient of AHP for butyl acrylate was calculated to be 0.80. The polymerization results are presented in Table 3.

TABLE 3

| [AHP]/[MONOMER] | $M_n$ (ZORBAX ™) |
|---|---|
| 0 | 19950 |
| 0.0101 | 8294 |
| 0.0201 | 5020 |
| 0.0350 | 3399 |
| 0.0498 | 2713 |

The foregoing examples have been presented for the purpose of illustration and description only and are not to be construed as limiting the scope of the invention in any way. The scope of the invention is to be determined by the claims appended hereto.

We claim:

1. In a method of radically polymerizing monomers, with a polymerization initiator, the improvement characterized by conducting the polymerization reaction in the further presence of a chain-transfer regulating amount of one or more hydroperoxides to thereby regulate the molecular weight of the resulting polymer, said hydroperoxides being represented by the formula:

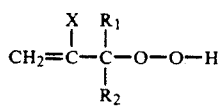

wherein $R_1$ and $R_2$ may be the same or different and are selected from hydrogen, $C_{1-4}$ alkyl, or together may form a $C_5$-$C_7$ aliphatic ring, and X is an activating group, that enhances the reactivity of the olefinic unsaturation towards free radical addition.

2. A method as claimed in claim 1 wherein X is an electron withdrawing group.

3. A method as claimed in claim 1 wherein X is a group selected from the group consisting of ester, acid, carbonyl, alkoxy carbonyl, alkoxy, phenyl, substituted aromatic groups, aryloxycarbonyl, carboxy, acyloxy, aryloxy, epoxy, carbamoyl, halogen, halocarbon, carbonate sulfones, sulfoxides, phosphonates, phosphine oxide

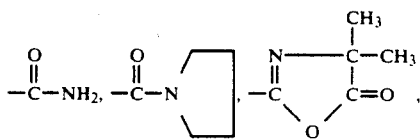

and cyano, a group containing two or more of these functionalities which may be the same or different, or, together with $R_1$, forms a $C_5$-$C_7$ aliphatic ring.

4. A method as claimed in any one of claims 1-3, wherein from 0.001 to 30.0 mole percent of said hydroperoxide based on the moles of polymerizable monomer, is employed.

5. A method as claimed in claim 1 wherein said polymerizable monomer is selected from the group consisting of acrylates, methacrylates, styrene, styrene derivatives, vinyl esters, dienes, acrylonitrile and α-olefins.

* * * * *